United States Patent [19]

Turunen et al.

[11] Patent Number: 4,583,984

[45] Date of Patent: Apr. 22, 1986

[54] PROCEDURE FOR TREATING CELLULOSE DERIVATIVE FIBRES

[75] Inventors: Olli Turunen; Jouko Huttunen; Kurt Ekman; Vidar Eklund; Leo Mandell, all of Porvoo, Finland

[73] Assignee: Neste Oy, Finland

[21] Appl. No.: 552,050

[22] PCT Filed: Mar. 25, 1983

[86] PCT No.: PCT/FI83/00028

§ 371 Date: Oct. 28, 1983

§ 102(e) Date: Oct. 28, 1983

[87] PCT Pub. No.: WO83/03433

PCT Pub. Date: Oct. 13, 1983

[30] Foreign Application Priority Data

Mar. 30, 1982 [FI] Finland ................... 821106

[51] Int. Cl.$^4$ .................. D06M 1/02; D01F 2/00; C08B 15/06
[52] U.S. Cl. ........................... 8/125; 264/187; 264/189; 264/195; 264/232; 264/344; 536/30
[58] Field of Search ............... 536/30, 32, 57, 58, 536/124; 264/232, 195, 200, 340, 331.16, 187, 189, 344; 8/125

[56] References Cited

U.S. PATENT DOCUMENTS

| | | | |
|---|---|---|---|
| 3,560,139 | 2/1971 | Suminokura et al. | 8/125 |
| 4,404,369 | 9/1983 | Huttunen et al. | 536/30 |
| 4,456,749 | 6/1984 | Mandell et al. | 536/30 |
| 4,486,585 | 12/1984 | Turunen et al. | 536/30 |

FOREIGN PATENT DOCUMENTS

| | | | |
|---|---|---|---|
| 61033 | 1/1982 | Finland. | |
| 0003433 | 10/1983 | World Int. Prop. O. | 536/30 |

*Primary Examiner*—Donald Czaja
*Assistant Examiner*—Hubert C. Lorin
*Attorney, Agent, or Firm*—Steinberg & Raskin

[57] ABSTRACT

The present invention concerns improving the properties of cellulose carbamate fibres. The wet strength properties in particular can be improved by treating the fibres with alkalis or organic bases, aiming to reduce the number of carbamate groups. The procedure may also be applied in the manufacturing of regenerated cellulose fibres.

17 Claims, No Drawings

PROCEDURE FOR TREATING CELLULOSE DERIVATIVE FIBRES

BACKGROUND OF THE INVENTION

The present invention concerns a procedure for treating cellulose derivative fibres. More specifically, the invention concerns a procedure for regulating the properties of cellulose carbamate fibres. Furthermore, the invention concerns a novel procedure for manufacturing regenerated cellulose fibres.

In the Finnish patent application No. 61,033 and U.S. Pat. No. 4,404,369 is disclosed a procedure for manufacturing an alkali-soluble cellulose derivative from cellulose and urea at elevated temperature. The procedure is based on the fact that on heating urea to its melting point or to a higher temperature it begins to decompose into isocyanic acid and ammonia. Isocyanic acid in itself is not a particularly stable compound; it tends to trimerize into isocyanuric acid. Furthermore, isocyanic acid also tends to react with urea, whereby biuret is formed. Isocyanic acid also reacts with cellulose, producing an alkali-soluble cellulose derivative which is called cellulose carbamate. The reaction may be written as follows:

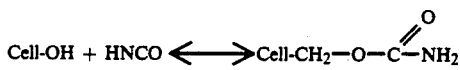

The cellulose compound thus produced, cellulose carbamate, may be dried subsequent to washing and stored even over prolonged periods, or it may be dissolved in an aqueous alkali solution for manufacturing fibres, for instance. From this solution can be manufactured cellulose carbamate fibres or films by spinning or by extruding, in like manner as in the viscose manufacturing process. The keeping quality of cellulose carbamate and its transportability in dry state afford a great advantage compared with cellulose xanthate in the viscose process, which cannot be stored nor transported, not even in solution form.

If, for instance, continuous fibre or filament manufactured from cellulose carbamate appropriate for textile uses is desired, the carbamate is first dissolved in alkali, e.g. in aqueous sodium hydroxide solution. From this solution may then be precipitated fibre or film, for instance in like manner as in the manufacturing of viscose fibre cellulose is regenerated from the NaOH solution of cellulose xanthate. In this connection, the cellulose carbamate solution is spun through spinnerets into an acid precipitation bath, which causes precipitation of the cellulose carbamate. The precipitation may also be accomplished into lower alcohols such as methanol, ethanol or butanol, or into hot aqueous salt solutions.

SUMMARY OF THE INVENTION

The properties of precipitated fibres are substantially influenced by the nitrogen content of the fibre, that is, the number of carbamate groups in the cellulose chain. It has been found that the carbamate groups increase the sensitivity of the fibres to water and, simultaneously, they impair the wet properties of the fibres. In some cases, this is even an advantage, whereas in other cases it is detrimental because, for instance in textile uses, the fibres are most often expected to have good wet strength.

The object of the present invention is a procedure by which the properties of cellulose carbamate fibres, in particular their wet properties, can be regulated as desired so that fibres suitable for each purpose are obtained. The procedure according to the invention for regulating the properties of cellulose carbamate fibres is characterized in that the fibres are treated with alkali or with an organic base.

By the aid of an alkali treatment according to the invention, the carbamate groups of the cellulose carbamate can be removed to the desired degree. Thus for instance the wet strength of the fibres substantially increases, while the wet stretchability decreases. If, again, for instance fibres for non-woven purposes are desired which have good water absorption capacity and swelling capacity, the alkali treatment of the invention may be carried out in a milder form. It is possible to carry the alkali treatment of cellulose carbamate fibres so far that a near complete removal of the carbamate groups from the fibres takes place. A fibre has then been obtained of which the solubility in alkali has gone down to the same level as that of regenerated cellulose fibres obtained by the viscose method, that is, less than 10%. In fact, a regenerated cellulose fibre is concerned, manufactured if a different way from the regenerated cellulose fibre of the viscose method. Thus, an object of the invention is a new process for manufacturing regenerated cellulose fibres comprising the treatment of cellulose carbamate fibres with an alkali or an organic base for substantially removing the carbamate group from the fibres. In a broader sense, by the invention is provided a new process for manufacturing regenerated cellulose fibres, this process being characterized by the following steps: dissolving cellulose carbamate in alkali, spinning or precipitating the carbamate solution to cellulose carbamate fibres or filaments, and conversion of the cellulose carbamate fibres or filaments to regenerated cellulose by treating the fibres with alkali or with an organic base. In the different steps of the process, any procedures or means may be used which result in accomplishment of said method steps, and as examples may be mentioned the procedures disclosed in the Finnish Pat. No. 61033 and U.S. Pat. Nos. 4,404,361, 4,486,585 and 4,456,749.

DETAILED DESCRIPTION OF THE PREFERRED EMBODIMENTS

Towards regulating the properties of cellulose carbamate fibres as taught by the invention, any alkali or organic base may be used. Sodium hydroxide and potassium hydroxide are suitable alkalis, and among organic bases may be mentioned as examples tetramethylammonium hydroxide and ethylene diamine. The amount of alkali or base required depends on the alkali used in each case. When using sodium hydroxide, the concentration of the alkali solution is preferably less than 2%, because larger NaOH quantities may adversely affect the properties of the fibre. The suitable NaOH quantity is in the range 0.1 to 2%. Potassium hydroxide does not act as powerfully as sodium hydroxide, and when it is used the suitable quantity is in the range of 0.1 to 4%. Organic bases are not as powerful as the above-mentioned, and therefore, the concentration range appropriate in their case may vary in the range of 0.1 to 10%.

The treatment time and temperature depend greatly on how large a proportion of the carbamate groups one desires to eliminate. For instance, a treatment at room temperature may be applied, although in that case the required treatment times may become quite long. The treatment times can be shortened by raising the temperature, even down to a few minutes. A temperature suitable in practice is mostly from room temperature to 100° C., but higher temperatures may be used if treatment means capable of containing pressure are at disposal.

The invention is described more in detail in the embodiment examples included. The percentages stated in the examples are to be understood as percent by weight. The wet strengths of staple fibres mentioned in the examples were determined by procedures which are readable in: BISFA (International Bureau for the Standardization of Man-Made Fibers), Internationally agreed method for testing regenerated cellulose and acetate staple fibres, 1970 Edition. The fibres were air-conditioned at 23° C. and 50% relative humidity.

EXAMPLE 1

Cellulose carbamate fibers were manufactured as follows. Bleached spruce sulphate cellulose (400 g) with DP brought to the level of 390 by the aid of γ radiation was impregnated at −40° C. with 3.3 liters of liquid ammonia in which had been dissolved 400 g urea. The cellulose was kept in this solution below the boiling point of ammonia for six hours, whereafter it was taken into room temperature. On evaporation of the ammonia, the urea cellulose was placed in a vacuum oven at 135° C. for three hours. An air flow produced by a water jet pump passed through the oven all the time.

The reaction product was washed with methanol, three times with water and once with methanol. The air-dry product had DP 340 and nitrogen content 1.7%. A solution was prepared by dissolving the cellulose carbamate thus manufactured in 10% NaOH solution, containing also ZnO for better solubility. The carbamate content of the solution was 5.5% and the ball viscosity, 50 seconds. Of the solution was determined the clogging number by the procedure presented in: H. Sihtola, Paperi ja Puu 44 (1962), No. 5, p. 295–300. The clogging number of the solution was found to be 495. The solution was pressed into sulphuric acid solution through a spinneret with 100 holes having diameter 0.09 mm. The precipitating solution contained 10% sulphuric acid, 7% aluminium sulphate and 20% sodium sulphate.

In connection with precipitation, the fibres were stretched 0–80% to improve their strength properties. Subsequent to washing and drying, cellulose carbamate fibres A-G were obtained which were used in the other examples. In Table I are presented the manufacturing conditions of the fibres.

TABLE I

| FIBRE | DISSOLVING | | PRECIPITATION |
|---|---|---|---|
| | NaOH (%) | ZnO (%) | Stretching (%) |
| A | 10 | 1.0 | 0 |
| B | 10 | 1.0 | 50 |
| C | 10 | 1.0 | 75 |
| D | 10 | 1.0 | 80 |
| E | 10 | 1.5 | 0 |

TABLE I-continued

| FIBRE | DISSOLVING | | PRECIPITATION |
|---|---|---|---|
| | NaOH (%) | ZnO (%) | Stretching (%) |
| F | 10 | 1.5 | 50 |
| G | 10 | 1.5 | 75 |

EXAMPLE 2

Fibres manufactured as in Example 1 were treated with NaOH solutions having various concentrations. The wet properties of the fibres were determined before and after the alkali treatment. The alkali solubility of the fibres was determined using the standard method SCAN - C2:61 and 5.5% NaOH solution.

In Table II following below are presented the properties of the fibres and after the NaOH treatment. The table reveals that alkali treatment of cellulose carbamate fibres improves the fibres' wet strength properties if the alkali concentration is at a reasonable level. When the alkali concentration goes up to 2%, the strength properties of the fibres deteriorate. When the alkali treatment is carried out at elevated temperature, better strength properties are achieved with considerably shorter treatment times. Stretching the fibres at the spinning phase also has a beneficial effect on the strength properties.

EXAMPLE 3

As in Example 2, NaOH treatments of cellulose carbamate fibres were carried out using elevated temperatures. Table III gives the properties of the fibres before and after the alkali treatment. The table reveals that remarkably short treatment times are achieved using the temperature 100° C.

EXAMPLE 4

As in Example 2, alkali treatments of cellulose carbamate fibres were carried out. Potassium hydroxide was used for alkali. Table IV presents the properties of the fibres before and after the alkali treatment.

The results reveal that potassium hydroxide is not quite as efficient as sodium hydroxide. Higher alkali concentrations than in the case of NaOH may be used in the treatment.

EXAMPLE 5

As in Example 2, alkali treatments of cellulose carbamate fibres were carried out. Tetramethylammonium hydroxide was used as alkali. Table V presents the properties of the fibres before and after the alkali treatment.

EXAMPLE 6

Fibres manufactured as in Example 1 were treated with NaOH so that a substantial part of the carbamate groups were removed and the alkali solubility of the fibres was lowered to the level of regenerated fibres obtained in the viscose process. In Table VI are presented the properties of the fibres before the alkali treatment and the properties of the regenerated fibres after the alkali treatment.

TABLE II

| | FIBRE CHARACTERISTICS BEFORE ALKALI TREATMENT | | | | | ALKALI TREATMENT | | | FIBRE CHARACTERISTICS AFTER ALKALI TREATMENT | | | | |
|---|---|---|---|---|---|---|---|---|---|---|---|---|---|
| Fibre | Alkali solubil. % | Nitrogen content % | Wet strength cN/dtex | Distens. when wet % | Modulus when wet cN/dtex | Alkali conc. % | Temperature °C. | Time h | Alkali solubil. % | Nitrogen content % | Wet strength cN/dtex | Distens. when wet % | Modulus when wet cN/dtex |
| A | 86.3 | 1.1 | 0.8 | 53 | 3 | 0.5 | 23 | 70 | 75.0 | 0.3 | 0.8 | 17 | 8 |
| C | 86.9 | " | 0.9 | 10 | 13 | 0.5 | " | " | 52.9 | 0.3 | 1.4 | 10 | 14 |
| " | " | " | " | " | " | 2.0 | " | " | 6.7 | 0.2 | 0.9 | 9 | 9 |
| D | 86.8 | 1.0 | 1.1 | 15 | 14 | 0.25 | 40 | 5 | 77.1 | 0.8 | 1.3 | 13 | 14 |
| " | " | " | " | " | " | 0.50 | " | " | 62.3 | 0.5 | 1.2 | 10 | 15 |
| " | " | " | " | " | " | 0.75 | " | " | 44.8 | 0.5 | 1.4 | 11 | 16 |

TABLE III

| | FIBRE CHARACTERISTICS BEFORE ALKALI TREATMENT | | | | | ALKALI TREATMENT | | | FIBRE CHARACTERISTICS AFTER ALKALI TREATMENT | | | | |
|---|---|---|---|---|---|---|---|---|---|---|---|---|---|
| Fibre | Alakli solubil. % | Nitrogen content % | Wet strength cN/dtex | Distens. when wet % | Modulus cN/dtex | Alkali conc. % | Temperature °C. | Time h | Alkali solubil. % | Nitrogen content % | Wet strength cN/dtex | Distens. when wet % | Modulus cN/dtex |
| E | 88.0 | 1.1 | 0.7 | 73 | 2 | 0.5 | 60 | 24 | 21.2 | 0.2 | 0.8 | 43 | 3 |
| F | " | " | 0.9 | 30 | 7 | " | " | " | 18.7 | " | 1.2 | 13 | 12 |
| G | " | " | 1.0 | 18 | 11 | " | " | " | 17.0 | 0.3 | 1.5 | 10 | 16 |
| D | 86.8 | 1.0 | 1.1 | 15 | 14 | " | 100 | 0.05 | 39.1 | 0.4 | 1.5 | 12 | 15 |
| " | " | " | " | " | " | " | " | 0.2 | 8.5 | 0.1 | 1.5 | 9 | 19 |

TABLE IV

| | FIBRE CHARACTERISTICS BEFORE ALKALI TREATMENT | | | | | ALKALI TREATMENT | | | FIBRE CHARACTERISTICS AFTER ALKALI TREATMENT | | | | |
|---|---|---|---|---|---|---|---|---|---|---|---|---|---|
| Fibre | Alkali solubil. % | Nitrogen content % | Wet strength cN/dtex | Distens. when wet % | Modulus when wet cN/dtex | Alkali conc. % | Temperature °C. | Time h | Alkali solubil. % | Nitrogen content % | Wet strength cN/dtex | Distens. when wet % | Modulus when wet cN/dtex |
| B | 88.0 | 1.1 | 0.8 | 32 | 7 | 0.5 | 22 | 72 | 77.6 | 0.6 | 1.0 | 19 | 10 |
| " | " | " | " | " | " | 1.0 | " | " | 59.5 | 0.5 | 1.0 | 18 | 9 |
| " | " | " | " | " | " | 2.0 | " | " | 29.5 | 0.4 | 1.1 | 15 | 10 |
| F | " | " | 0.9 | 30 | " | 0.5 | 100 | 0.2 | 38.5 | 0.3 | 1.1 | 12 | 11 |
| " | " | " | " | " | " | " | " | 1.0 | 12.1 | 0.2 | 1.2 | 12 | 12 |
| " | " | " | " | " | " | 2.0 | " | 0.2 | 22.0 | 0.3 | 1.1 | 12 | 11 |
| " | " | " | " | " | " | " | " | 1.0 | 7.3 | 0.2 | 1.2 | 12 | 11 |

TABLE V

| | FIBRE CHARACTERISTICS BEFORE ALAKLI TREATMENT | | | | | ALKALI TREATMENT | | | FIBRE CHARACTERISTICS AFTER ALKALI TREATMENT | | | | |
|---|---|---|---|---|---|---|---|---|---|---|---|---|---|
| Fibre | Alakli solubil. % | Nitrogen content % | Wet strength cN/dtex | Distens. when wet % | Modulus when wet cN/dtex | Alkali conc. % | Temperature °C. | Time h | Alkali solubil. % | Nitrogen content % | Wet strength cN/dtex | Distens. when wet % | Modulus when wet cN/dtex |
| F | 88.0 | 1.1 | 0.9 | 30 | 7 | 0.5 | 22 | 72 | 88.0 | 0.6 | 1.0 | 21 | 6 |
| " | " | " | " | " | " | 1.0 | " | " | 74.6 | 0.5 | 1.0 | 18 | 7 |
| " | " | " | " | " | " | 2.0 | " | " | 67.0 | 0.3 | 1.0 | 18 | 7 |
| " | " | " | " | " | " | 0.5 | 100 | 0.2 | 50.0 | 0.3 | 1.0 | 18 | 9 |
| " | " | " | " | " | " | 2.0 | " | 0.5 | 16.8 | 0 | 1.2 | 13 | 11 |
| " | " | " | " | " | " | " | " | 1.0 | −11.7 | 0.1 | 1.0 | 11 | 11 |

TABLE VI

| | FIBRE CHARACTERISTICS BEFORE ALKALI TREATMENT | | | | | ALKALI TREATMENT | | | FIBRE CHARACTERISTICS AFTER ALKALI TREATMENT | | | | |
|---|---|---|---|---|---|---|---|---|---|---|---|---|---|
| Fibre | Alkali solubil. % | Nitrogen content % | Wet strength cN/dtex | Distens. % | Modulus cN/dtex | Alkali conc. % | Temperature °C. | Time h | Alkali solubil. % | Nitrogen content % | Wet strength cN/dtex | Distens. % | Modulus cN/dtex |
| A | 86.3 | 1.1 | 0.8 | 53 | 3 | 2.0 | 23 | 70 | 7.1 | 0.1 | 0.7 | 17 | 8 |
| D | 86.8 | 1.0 | 1.1 | 15 | 14 | 0.5 | 100 | 0.25 | 6.1 | 0 | 1.6 | 10 | 15 |
| " | " | " | " | " | " | " | " | 1.0 | 3.8 | 0 | 1.4 | 8 | 17 |

We claim:

1. Method of regulating the wet properties of cellulose carbamate fibres or filaments, which comprises treating such fibres or filaments with a solution of an alkali or of an organic base of a concentration and at a temperature and for a period of time such that the number of carbamate groups in the cellulose carbamate is reduced without adversely affecting the properties of the resulting cellulose carbamate fibres or filaments which thus remain in solid form, thereby increasing wet strength and decreasing wet stretchability of the thus-treated fibres or filaments.

2. The method of claim 1 comprising
treating the fibres or filaments with NaOH or KOH solution.

3. The method of claim 2, comprising
treating the fibres or filaments with 0.1 to 2% NaOH or KOH solution.

4. The method of claim 2, comprising
treating the fibres or filaments with 0.1 to 4% KOH solution.

5. The method of claim 1, comprising
treating the fibres or filaments with a tetramethylammonium hydroxide or ethylene diamine solution.

6. The method of claim 5, comprising
treating the fibres or filament with 0.1 to 10% tetramethylammonium hydroxide or ethylene diamine solution.

7. The method of claim 1, comprising
treating the fibres or filaments at a temperature in the range from room temperature to about 100° C.

8. The method of claim 1, comprising
treating the fibres or filaments for a time sufficient to remove substantially all of the carbamate groups, thus obtaining regenerated cellulose fibres or filaments.

9. The method of claim 1, comprising
treating the fibres or filaments for a time sufficient to form regenerated cellulose fibres or filaments of less than 10% alkali solubility.

10. In a method for preparing improved cellulose carbamate fibres or filaments comprising the steps of
reacting cellulose and urea at elevated temperatures to form cellulose carbamate,
dissolving the thus-formed cellulose carbamate in an alkaline solution to prepare a spinning solution from which cellulose carbamate can be spun, and
spinning the thus-prepared solution through an acid precipitation solution to form fibres or filaments,
the improvement comprising the step of
treating the thus-spun fibres or filaments with a solution of an alkali or an organic base of a concentration and at a temperature and for a period of time such that the number of carbamate groups in the cellulose carbamate is reduced without adversely affecting the properties of the resulting cellulose carbamate fibres or filaments which thus remain in solid form, thereby increasing wet strength and decreasing wet stretchability of the thus-treated fibres or filaments.

11. In the method of claim 10, the improvement comprising the step of
treating the thus-spun fibres or filaments with a solution of 0.1 to 4% alkali concentration.

12. In the method of claim 11, the improvement comprising the step of
treating the thus-spun fibres or filaments with a solution of 0.1 to 2% alkali concentration.

13. In the method of claim 10, the improvement comprising the step of
treating the thus-spun fibres or filaments with a solution of 0.1 to 10% concentration of organic base.

14. In the method of claim 10, the improvement comprising the step of
treating the thus-spun fibres or filaments at a temperature in the range from room temperature to about 100° C.

15. In the method of claim 14, the improvement comprising the step of
treating the thus-spun fibres or filaments at a temperature of about 100° C. for a period of time of up to about one hour.

16. In the method of claim 10, the improvement comprising the step of
treating the thus-spun fibres or filaments for a time sufficient to remove substantially all of the carbamate groups, thus obtaining regenerated cellulose fibres or filaments.

17. In the method of claim 10, the improvement comprising the step of
treating the thus-spun fibres or filaments for a time sufficient to form regenerated cellulose fibres or filaments of less than 10% alkali solubility.

* * * * *